United States Patent
Kadu et al.

(10) Patent No.: US 12,190,163 B2
(45) Date of Patent: Jan. 7, 2025

(54) SYSTEMS AND METHODS FOR DATA SYNCHRONIZATION IN A MULTI-TENANT SYNCHRONIZATION SYSTEM

(71) Applicant: InContact Inc., Salt Lake City, UT (US)

(72) Inventors: Swati Pranay Kadu, Pune (IN); Salil Dhawan, Pune (IN); Mukesh Kumar Agarwal, Pune (IN); Karthik Srinivasan, Sandy, UT (US); Akhilesh Suresh Mahajan, Pune (IN)

(73) Assignee: InContact Inc., Salt Lake City, UT (US)

( * ) Notice: Subject to any disclaimer, the term of this patent is extended or adjusted under 35 U.S.C. 154(b) by 455 days.

(21) Appl. No.: 17/701,806

(22) Filed: Mar. 23, 2022

(65) Prior Publication Data

US 2023/0305897 A1 Sep. 28, 2023

(51) Int. Cl.
*G06F 9/50* (2006.01)
*G06F 16/25* (2019.01)
*G06F 16/27* (2019.01)

(52) U.S. Cl.
CPC .......... *G06F 9/5038* (2013.01); *G06F 16/256* (2019.01); *G06F 16/27* (2019.01); *G06F 2209/5021* (2013.01)

(58) Field of Classification Search
CPC ...... G06F 9/5038; G06F 16/256; G06F 16/27; G06F 2209/5021
See application file for complete search history.

(56) References Cited

U.S. PATENT DOCUMENTS

| | | | |
|---|---|---|---|
| 11,895,126 B1* | 2/2024 | Satish | H04L 63/1425 |
| 2023/0289214 A1* | 9/2023 | Tang | G06F 9/546 |

* cited by examiner

*Primary Examiner* — Sisley N Kim
(74) *Attorney, Agent, or Firm* — PEARL COHEN ZEDEK LATZER BARATZ LLP (57) ABSTRACT

A method and system for data synchronization in a multi-tenant data synchronization system is provided. The method and system can allow for prioritizing events from a plurality of tenants for synchronization based at least one, a tenant prioritization score.

12 Claims, 4 Drawing Sheets

| Tenant | Tenant Type | Tenant Trend Indicator | Logged Agents | Active Agents | Agent Activity Levels | Account Impact Score | Max Call Queue Size | Call Queue | Call Queue Factor | Event Priority | ISI Score |
|---|---|---|---|---|---|---|---|---|---|---|---|
| T1 | Trial | 0 | 0 | 100 | 0 | 0 | 0 | 0 | 1 | 0.1 | 0 | 0 |
| T2 | Trial | 0 | 0 | 100 | 50 | 0.5 | 0 | 10 | 12 | 1.2 | 0 | 0.5 |
| T5 | Customer | 1 | 1 | 100 | 0 | 0 | 5 | 10 | 3 | 0.3 | 0 | 0.8 |
| T6 | Customer | 1 | 1 | 100 | 50 | 0.5 | 10 | 10 | 4 | 0.4 | 0 | 1.9 |
| T7 | Customer | 1 | 1 | 100 | 90 | 0.9 | 10 | 10 | 5 | 0.5 | 0 | |
| T8 | Customer | 1 | 1 | 100 | 90 | 0.9 | 10 | 10 | 5 | 0.5 | 1 | |
| T9 | Customer | 1 | 1 | 100 | 90 | 0.9 | 10 | 10 | 5 | 0.5 | 0 | 2.4 |
| T10 | Customer | 1 | 1 | 100 | 10 | 0.1 | 20 | 10 | 4 | 0.4 | 0 | 2.5 |
| T11 | Customer | 1 | 1 | 100 | 80 | 0.8 | 20 | 10 | 4 | 0.4 | 0 | 3.2 |
| T12 | Customer | 1 | 1 | 100 | 90 | 0.9 | 20 | 20 | 8 | 0.4 | 0 | 3.3 |
| T14 | Customer | 1 | 1 | 100 | 10 | 0.1 | 30 | 10 | 4 | 0.4 | 0 | 3.5 |
| T15 | Customer | 1 | 1 | 100 | 50 | 0.5 | 30 | 10 | 2 | 0.2 | 0 | |
| T16 | Customer | 1 | 1 | 100 | 50 | 0.5 | 30 | 10 | 5 | 0.5 | 0 | |
| T18 | Customer | 1 | 1 | 100 | 10 | 0.1 | 32 | 10 | 8 | 0.8 | 0 | 4.1 |
| T19 | Customer | 1 | 1 | 20000 | 10000 | 0.5 | 33 | 10 | 1 | 0.1 | 0 | 3.9 |
| T21 | Customer | 1 | 1 | 40000 | 20000 | 0.5 | 33 | 10 | 1 | 0.1 | 0 | 3.9 |
| T22 | Customer | 1 | 1 | 100 | 20 | 0.2 | 38 | 10 | 5 | 0.5 | 0 | 4.5 |
| T23 | Customer | 2 | 2 | 100 | 1 | 0.01 | 40 | 10 | 5 | 0.5 | 0 | |
| T24 | Customer | 1 | 1 | 100 | 10 | 0.1 | 40 | 10 | 5 | 0.5 | 0 | |
| T26 | Customer | 1 | 1 | 100 | 10 | 0.1 | 48 | 10 | 4 | 0.4 | 0 | 5.3 |
| T30 | Customer | 1 | 1 | 100 | 50 | 0.5 | 50 | 10 | 8 | 0.8 | 0 | 6.3 |
| T31 | Customer | 1 | 1 | 100 | 90 | 0.9 | 50 | 10 | 1 | 0.1 | 0 | 6 |
| T32 | Customer | 1 | 1 | 100 | 100 | 1 | 50 | 10 | 10 | 1 | 0 | 7 |
| T33 | Customer | 1 | 1 | 100 | 100 | 1 | 50 | 30 | 30 | 1 | 1 | 7.1 |
| T34 | Customer | 2 | 2 | 100 | 100 | 1 | 50 | 10 | 10 | 1 | 0 | 8 |

SYSTEMS AND METHODS FOR DATA SYNCHRONIZATION IN A MULTI-TENANT SYNCHRONIZATION SYSTEM

FIELD OF THE INVENTION

The invention relates to data synchronizations in a multi-tenant synchronization system. In particular, the invention relates to prioritizing data to be synchronized based on a tenant tier to perform multi-tenant data synchronization.

BACKGROUND OF THE INVENTION

Current system (e.g., SAAS platforms) can have multiple tenants (e.g., customers) access the platform at the same time. As tenants access the platform, they can provide information that requires data within the platform to change. It can be desirable to ensure that data changes are made quickly enough such that the next time the particular data item is accessed, the changed data, and not the old data is accessed.

Current systems that employ data synchronization often execute the synchronization in random order which can cause data to fail to be properly synchronized. In some data synchronizations systems, if there is a sudden surge of data updates from one or more tenants, other tenants even if they have comparatively less updates can have a delay in data synchronization. Activities like bulk uploads, agent attributes, license updates, and/or permission updates can cause a sudden surge of data updates from some tenants causing other tenants to experience delays.

Therefore, it can be desirable to synchronize data of multiple tenants with minimized delays.

SUMMARY OF THE INVENTION

One advantage of the invention can include prioritized synchronization of data such that tenants that are most likely to use to need data quickly have data synchronized first. One advantage of the invention is an ability to process data in parallel in tiers such that requests from lower tiers do not impact high tier synchronization. One advantage of the invention can include isolation of data synchronization events for premium tenant from lower priority and test tenants. One advantage of the invention can include an ability to set a priority per event for given tenant.

In one aspect, the invention involves a method for data synchronization in a multi-tenant data synchronization system. The method can involve receiving, by a computing device, a plurality of events for each tenant of a plurality of tenants in the multi-tenant system, wherein each event type in the plurality of events has a predetermined event priority. The method can also involve for each of the plurality of events: i) determining, by the computing device, a tenant prioritization score based on an agent activity level of a particular tenant of the plurality of tenants that is associated with the particular event of the plurality of events; ii) assigning, by the computing device, a tenant tier to the respective event based on the tenant prioritization score; and iii) creating, by the computing device, a data stream for each tenant tier, wherein each data stream includes a plurality of events that was assigned to the respective tenant tier. The method can also involve processing, by the computing device, the created data streams in parallel, and the plurality of events in each data stream in an order that is according to the predetermined priority of the event type for the particular event to perform multi-tenant data synchronization.

In some embodiments, the method involves assigning a tenant tier to the respective event further comprises adding the tenant tier to a header of the respective event. In some embodiments, an agent activity level is based on an average of a number of active agents divided by a number of logged in agents for a given period of time. In some embodiments, determining the tenant prioritization score is further based on a weight that distributes the tenants to different tiers.

In some embodiments, the method involves determining a maximum processing capacity for each tenant tier, and utilizing a capacity of a higher tier among the tenant tiers if a lower tier among the tenant tiers is not utilized.

In some embodiments, the number of tenant tiers can be an integer value. In some embodiments, the tenant prioritization score is determined by ($W1$*account impact score)+ Agent Activity level+tenant trend indicator*call queue factor+($W2$*data synchronization event priority).

In another aspect, the invention includes a non-transitory computer program product comprising instruction which, when the program is executed cause the computer to receive a plurality of events for each tenant of a plurality of tenants in the multi-tenant system, wherein each event type in the plurality of events has a predetermined event priority. The computer can also be caused to for each of the plurality of events: i) determine a tenant prioritization score based on an agent activity level of a particular tenant of the plurality of tenants that is associated with the particular event of the plurality of events, ii) assign a tenant tier to the respective event based on the tenant prioritization score; and iii) create a data stream for each tenant tier, wherein each data stream includes a plurality of events that was assigned to the respective tenant tier. The computer can also be caused to process the created data streams in parallel, and the plurality of events in each data stream in an order that is according to the predetermined priority of the event type for the particular event to perform multi-tenant data synchronization.

In some embodiments, assigning a tenant tier to the respective event further comprises adding the tenant tier to a header of the respective event. In some embodiments, an agent activity level is based on an average of a number of active agents divided by a number of logged in agents for a given period of time. In some embodiments, determining the tenant prioritization score is further based on a weight that distributes the tenants to different tiers.

In some embodiments, the non-transitory computer program product further causes the computer to determine a maximum processing capacity for each tenant tier, and utilize a capacity of a higher tier among the tenant tiers if a lower tier among the tenant tiers is not utilized.

In some embodiments, the number of tenant tiers can be an integer value. In some embodiments, the tenant prioritization score is determined by ($W1$*account impact score)+ Agent Activity level+tenant trend indicator*call queue factor+($W2$*data synchronization event priority).

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
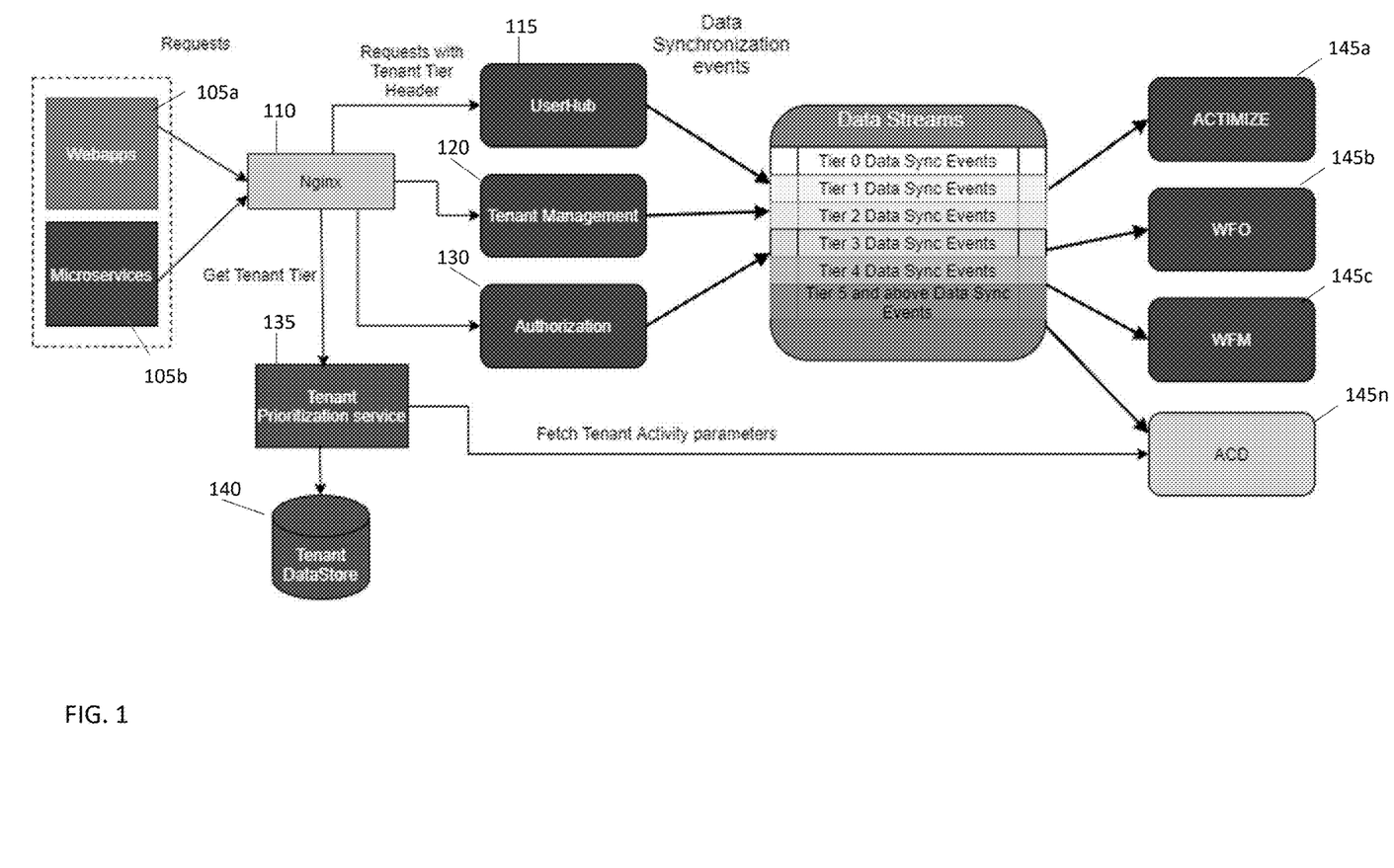
FIG. 1 is a block diagram of a system for data synchronization in a multi-tenant data synchronization system, according to some embodiments of the invention.

FIG. 1 is a block diagram of a system 100 for data synchronization in a multi-tenant data synchronization system, according to some embodiments of the invention. The system 100 includes webapps 105a, microservices 105b, a request router 110, a user hub server 115, a tenant management server 120, an authorization server 130, tenant prioritization server 135, tenant data storage 140, and a plurality of applications, 145a, 145b, 145c, and 145n.

During operation, requests (e.g., from users associated with a tenant) are received from the webapps 105a and microservices 105b. The webapps can be web-based applications that send API requests to get a response. The webapps 105a can send API requests for customers and/or requests for completing certain background activities. The microservices 105b can be microservices as are known in the art. For example, microservices as are used in Amazon EC2.

The incoming requests from webapps 105a and microservices 105b can be routed through the request router 110. The incoming request can include a token. The request router 110 can be a Nginx server.

The request router 110 can fetch a tenant prioritization score and a tenant tier from the tenant prioritization server 135. The fetch can be based on identifying a tenant from the request token. The tenant prioritization server 135 can determine a tenant prioritization score for requests based on data retrieved from the tenant data storage 140.

The data retrieved from the tenant data storage 140 can include a tenant identification, tenant status, tenant account impact score, tenant type, tenant trend indicator, agent activity level, call queue size, priority for the tenant, for a particular tenant associated with each request, and/or other factors as described below in further detail in FIG. 3.

The request router 110 can receive back from the tenant prioritization server 135 the requests with an appended header, where the appended header can include the tenant prioritization score and/or the tenant tier. In some embodiments, a load balancer can be used to route the requests.

The request router can route the requests with the appended header through one or more services, e.g., the user hub server 115, a tenant management server 120, an authorization server 130, as shown in FIG. 1. The user hub server 115, a tenant management server 120, an authorization server 130 can generate data synchronization events, for example audit, data change, name updated, data replication and/or reporting events. As is understood by one of ordinary skill in the art, there are other events that can be data synchronization events.

The data synchronization events can be added to one data stream of a plurality of data streams according to its tenant tier, wherein each of the plurality of data streams is associated with a different tenant tier. The data streams can be transmitted to one or more applications 145a, 145b, 145c, and 145n, respectively. In some embodiments, the one or more applications 145a, 145b, 145c, and 145n process the events according to a predefined processing quota, as discussed in further detail below with respect to FIG. 3.

In some embodiments, the data synchronization events traffic is monitored periodically and if it increases beyond a predefined threshold an alarm is triggered. If the alarm is triggered, the service can be auto-scaled such that event processing capacity lambda can trigger autoscaling of the service. Once service auto-scaled the based on the autoscaling the Event Processing capacity can be re-configured.

In various embodiments, the servers and/or applications of FIG. 1 are implemented on any combination of computing devices. The system 100 can be a SAAS cloud based solution used with contact centers that can require data synchronization across systems. For example, systems such as the following systems can require data synchronization between one or more of them: User Management can maintain user data (e.g., username, personal information, roles, and/or permissions); Tenant Management can maintain tenant data (e.g., customer name, type, licenses, user count); Automatic Call Distributor can be used to distribute incoming calls to agents; Work Force Management can provide an option to manage the contact center work force, for example, creating schedules for agents and/or managing shifts; work Force Optimization modules can help optimize the contact center work force so that agents are efficiently utilized; Auditing can maintain the audit data e.g., keep track of activities and changes done by users; and/or Reporting to provide various reports, e.g., agent activity, agent utilization, agent performance and/or billing reports etc.

Figure 2:
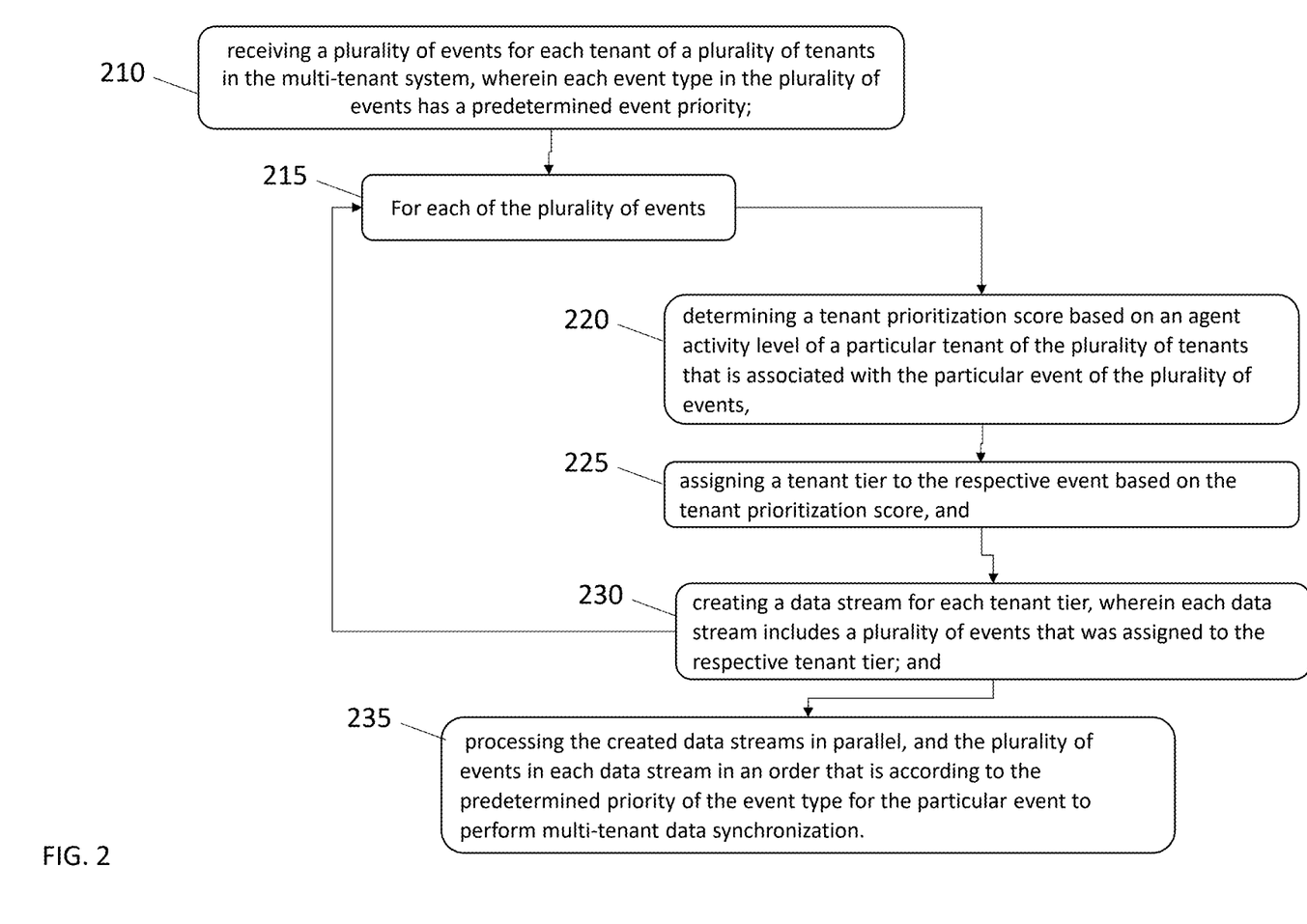
FIG. 2 is a method for data synchronization in a multi-tenant data synchronization system, according to some embodiments of the invention.

Turning to FIG. 2 is a method 200 for data synchronization in a multi-tenant data synchronization system, according to some embodiments of the invention.

The method can involve receiving (e.g., by a tenant prioritization server 135) a plurality of events for each tenant of a plurality of tenants in the multi-tenant system, wherein each event type in the plurality of events has a predetermined event priority (Step 210). The event priority can be input predefined by the respective tenant. The event priority can be input by a user via a user interface, read from a user a file, or any combination.

For example, each tenant can have a plurality of events (e.g., any integer number of events), and the plurality of events can have an event priority (e.g., data synchronization event priority). The priority can be an ordered priority from high to low or low to high. The priority can be binary. For example, table 1 shown below is an example of a low to high event priority for a tenant.

TABLE 1

| Event Type | Event Priority |
|---|---|
| User Status Change | 0 |
| User information Update | 1 |
| User permission Update | 2 |
| Customer Interaction Update | 3 |
| Customer Feedback | 4 |
| Role display name update | 5 |

In Table 1, a higher priority can indicate a more important event compared to a lower priority.

The method can also involve for each of the plurality of events (Step 215), determining, by the computing device, a tenant prioritization score based on an agent activity level of a particular tenant of the plurality of tenants that is associated with the particular event of the plurality of events (Step 220).

One or more factors can effect the tenant prioritization score for a given event. Agent activity level, account impact score, call queue size, data synchronization even priority, or any combination there.

Agent activity level for each tenant for each event (e.g., a level of activity for one or more agents of the tenant) can effect a prioritization of a data synchronization event due to, for example, the more active agents of a particular tenant, typically the higher likelihood that the data being synchronized is to be accessed more quickly. In some embodiments, agent activity levels over a given time period (e.g., hourly basis) is determined as follows:

$$\text{Agent activity level} = \text{average of}(\text{number of active agents}/\text{total number of logged in agents}) \quad \text{EQN. 1}$$

For example, if for duration of 30 minutes, there are 100 logged in agents, and 50 are active, then using EQN. 1, the agent activity level is 50/100 or 0.5.

Starting tier of a tenant can be based on the account impact score. For example, if the account impact score is 20, then the event can have a tenant prioritization score above 2.

A higher account impact score for a tenant can indicate that the tenant is a highly valued tenant and disruptions may cause a loss to the tenant. A health score may be predetermined based on the particular tenant, revenue of the tenant, business area of the tenant, future revenue predictions of the tenant, of any combination thereof.

Typical ranges for a SaaS-platform-contact-center provider account impact score range from 5 to 25, whereas premier tenants can have higher account impact score that is greater than 35. This scoring can ensure that premier tenants receive the highest priority. Based on future forecasting of added tenants and existing tenants, the account impact score of each tenant can be re-determined periodically.

In some embodiments, a higher tenant prioritization score can indicate a highly valued tenant such that any disruption in data synchronization can cause a major disruption to the tenant. A major disruption, for example, can be if a fraudster gains access to system and disables the agent's permissions to block them from taking calls. An agent's permissions to block them from taking calls can also occur if some new administrator accidently disables agents. In such scenarios when there also a sudden load of events from other tenants the Agent state synchronization can take time thereby disrupting the tenant services for some time until the agent state synchronization events can be processed. Agent unavailability for some time can lead to calls getting dropped as no agent is available to take calls leading to customer dissatisfaction and/or could prove fatal for services like 911 or other emergency services.

The account impact score can be based on one or more measures. The one or more measures can be tenant specific. In some embodiments, the measures that effect the account impact score are input by a user (e.g., via an interface) and/or retrieved from a file. For example, the account impact score can be determined as shown below in Table 2.

TABLE 2

| Measure | Input | Impact | Formula |
|---|---|---|---|
| Health Score | 100 | 7 | Health Score- If Account on the Incident has a Health Score less than 40, 1 Point<br>If Account has a Health Score from 40 to 49.99, 2 Points<br>If Account has a Health Score from 50 to 59.99, 3 Points<br>If Account has a Health Score from 60 to 69.99, 4 Points<br>If Account has a Health Score from 70 to 79.99, 5 Points<br>If Account has a Health Score from 80 to 89.99, 6 Point<br>If Account has a Health Score from 90 to 99.99, 7 Point |
| Handles Critical Services | 20 | 20 | If Account handles critical services like healthcare, translation services, accidental insurance etc. |
| Partner (yes/no) | Yes | 2 | Yes = 2, No = 0 |
| Success Package | ENTERPRISE PLUS | 8 | If Account on the Incident has a Success Package of "ENTERPRISE PLUS", 8 Points<br>If Account on the Incident has a Success Package of "ENTERPRISE", 6 Points<br>If Account on the Incident has a Success Package of "PREMIER PLUS", 4 Points<br>If Account on the Incident has a Success Package of "PREMIER", 2 Points<br>Else 0 |
| Market Segment | Enterprise | 3 | Market Segment<br>If Account on the Incident has a Market Segment of Key, 3 Points<br>If Account on the Incident has a Market Segment of Premier 2 Points<br>Else 0 |
| Specific Partner | XYZ | 5 | Specific Partner<br>If Account on the Incident has a Main/Partner Account of Special Partner - 5 Points<br>Else 0 |

In some embodiments, health score is determined based on tenant age, revenue the account brings, business area, future revenue predications or any combination thereof.

Call queue size can indicate how busy agents of a particular tenant are within the next few minutes.

In some embodiments, call queue factor is determined. The call queue factor can be the number of calls that are waiting for agents to respond. The call queue factor can be a ratio of number of calls that are waiting to the total number of expected calls. Each tenant can estimate that they can receive a max n number of calls at a time, where n is an integer, to plan agents accordingly. In some embodiments, if the call queue factor is 1 it indicates that all the agents are busy and there are still more calls in queue so agents are predicted to remain busy for a longer time. In some embodiments, the call queue factor can be used as some tenants may have more call queue size but they may have planned to have that many agents to take the calls so they may not be that busy. In this embodiment, if a tenant has planned for less calls and is getting more calls it can indicate that their agents are to remain more busier for a longer time as customers tend to recall or wait in queue most of the time.

The call queue factor for a given duration can be determined as follows:

call queue Factor=average of(call queue size/maximum allowed call queue size)     EQN. 2

Where the maximum allowed call queue size is a total number of calls which a tenant allows to be in a queue waiting to be answered. The call queue factor can be determined at a frequency of 2 to 5 minutes.

The event priority (e.g., data synchronization event priority) can be determined as described above.

Tenant trend indicator can be 1 for a tenant that has a number of request that is below a predetermined threshold and/or 2 for a number of request that is above the predetermined threshold.

The tenant trend indicator can indicate a trend for the tenant traffic. Tenant traffic can be monitored at regular intervals. Tenant traffic can be based on factors, for example, a number of inbound and/or outbound calls and/or other interactions handled for a given period (e.g., an hour). If the tenant traffic increases along a trend which indicates that the tenant is getting, for example, close to double the number of calls, that can be an indicator that the tenant is to be prioritized. A normal trend can indicate that the number of calls/interactions handled are close to average. If threshold is set to double of average and if the calls/interactions cross that count the Tenant trend indicator can be set to 2. The number can be set to 1, 2 or higher based on thresholds that a contact center can input. For example, 1—near average traffic, 2—double the traffic, 3—triple the traffic.

In some embodiments, the tenant prioritization score (e.g., tenant data prioritization score (TDP)) is determined as follows:

TDP=$w1$×Account Impact Score+$w2$×Agent Activity levels+$w3$×Tenant Trend Indicator×Call Queue Size+$w4$×Data Synchronization Event Priority
Default weights: $w1$–0.1, $w2$–1, $w3$–1, $w4$–0.1     EQN. 3

Where $w_1$, $w_2$ and $w_3$ are a weighting factors. In some embodiments, $w_1$ is used to effect the distribution of the tenant to a different tier. For example, increasing $w_1$ can cause the tenant to be in a higher tier. In some embodiments, $w_2$ and $w_3$ are 1.0 by default. $w_2$ and $w_3$ can be modified to move tenant to different tiers and/or cause the factors they are attached too to have more or less impact on the tier.

In various embodiments, some of the factors of EQN. 3 are not used to determine the TDP. For example, in some embodiments, the data synchronization event priority term is left off. In some embodiments, the call queue size term is left off.

Table 3 shows an example of a table showing for a particular tenant, the factors that can be used in determining the TDP.

TABLE 3

| TenantId | Status | AccountImpact Score | TenantType | TenantTrend Indicator | Agent Activity levels | Call Queue Size |
|---|---|---|---|---|---|---|
| 1 | ACTIVE | 0 | Trial | 1 | 0.5 | 0 |
| 2 | ACTIVE | 35 | Customer | 2 | 0.9 | 5 |
| 3 | ACTIVE | 10 | Partner | 1 | 0.1 | 9 |

Figure 3:
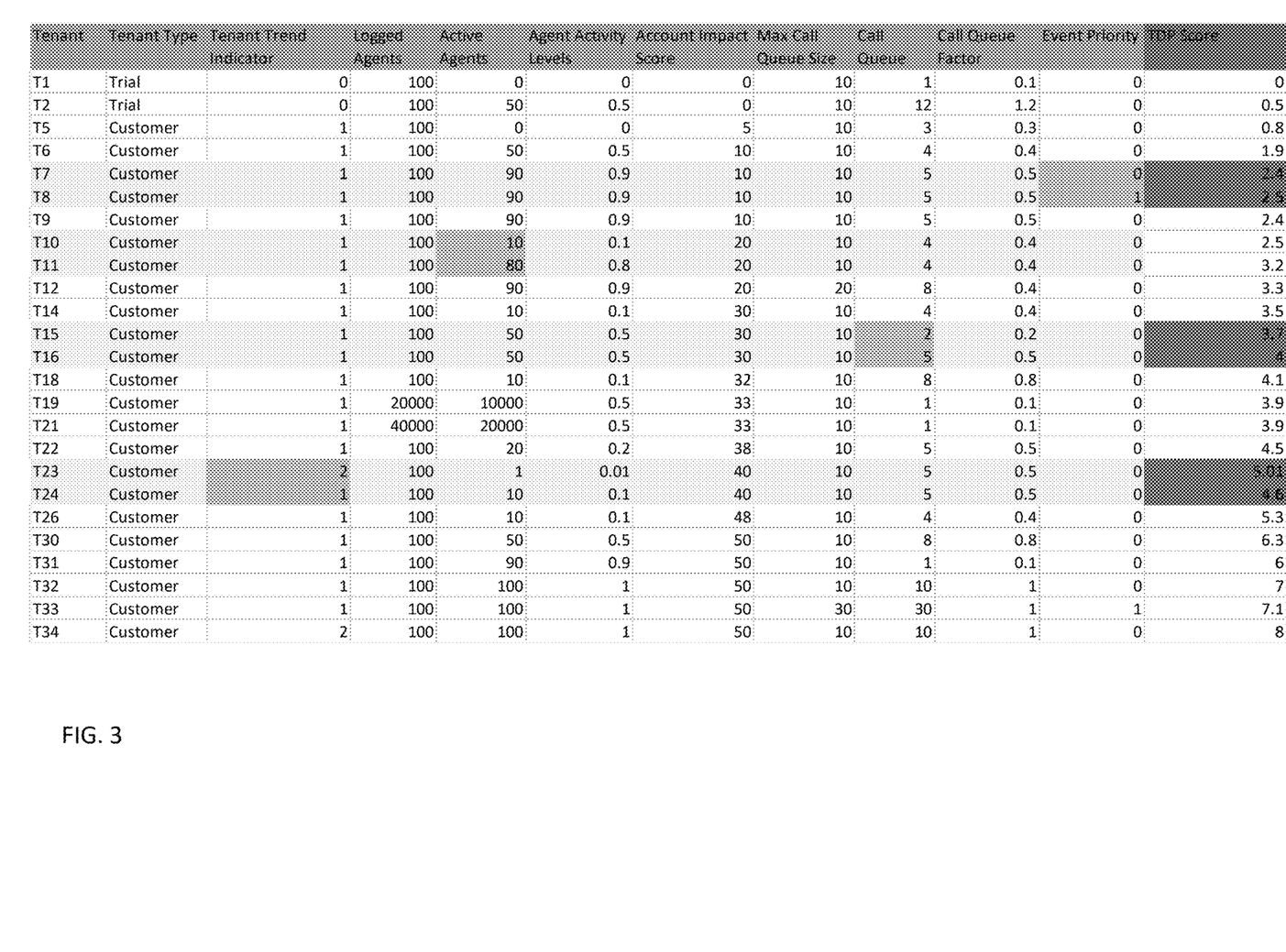
FIG. 3 shows an example of TDP for multiple tenants, for multiple events, according to some embodiments of the invention.

Turning to FIG. 3, FIG. 3 shows an example of TDP for multiple tenants, for multiple events, according to some embodiments of the invention. As shown in FIG. 3, there are multiple tenants having various values for the parameters that can impact the TDP. In this example, for Tenants T7 and T8, given all the same values, because T8 has an event priority that is higher than T7, the TDP of T8 is higher then T7. In this example, T10 and T11 also have almost all the same values, but T11 has 80 active agents in comparison to T10's 10 active agents, causing the TDP for T11 to be higher then T10. As is apparent to one of ordinary skill in the art, the value in FIG. 3 are examples only and other values can be used for tenants as described herein.

Turning back to FIG. 2, the method also involves assigning a tenant tier to the respective event based on the tenant prioritization score (Step 225). The tenant tier assignment can be predetermined. The tenant tier assignment can be input by a user (e.g., via a user interface) and/or retrieved from a file. The tenant tier assignment can be determined as shown below in Table 4.

TABLE 4

| Tenant Request Prioritization Score | Tier |
|---|---|
| 0 to 0.99 | 0 |
| 1 to 1.99 | 1 |
| 2 to 2.99 | 2 |
| 3 to 3.99 | 3 |
| 4 to 4.99 | 4 |
| 5 and above | 5 |

The method also involves creating a data stream for each tenant tier, wherein each data stream includes a plurality of events that was assigned to the respective tenant tier (Step 230).

The method also involves processing the created data streams in parallel, and the plurality of events in each data stream in an order that is according to the predetermined priority of the event type for the particular event to perform multi-tenant data synchronization (Step 235).

In some embodiments, each tenant can allocate a percentage of a total processing capacity to each tier. The allocation of processing capacity per tenant tier can be predetermined and input by a user (e.g., via a user interface), and/or read via a file. For example, table 5 as shown below is an example of predetermined allocation of processing capacity per tenant tier.

TABLE 5

| Tenant Tier | Processing Capacity Percentage |
|---|---|
| 0 | 2% |
| 1 | 8% |
| 2 | 15% |
| 3 | 20% |
| 4 | 25% |
| 5 and above | 30% |

Continuing with the example of Table 5, assume a system receives 1000 events to process, according to the predetermined allocation of processing capacity the event can be processed as shown below in Table 6.

TABLE 6

| Tenant Tier | Processing Capacity Percentage | 1000 Events |
|---|---|---|
| 0 | 2% | 20 |
| 1 | 8% | 80 |
| 2 | 15% | 150 |
| 3 | 20% | 200 |
| 4 | 25% | 250 |
| 5 and above | 30% | 300 |

In various embodiments, one or more tenants can reconfigure the system to have different predetermined parameters at different periods of time.

Figure 4:
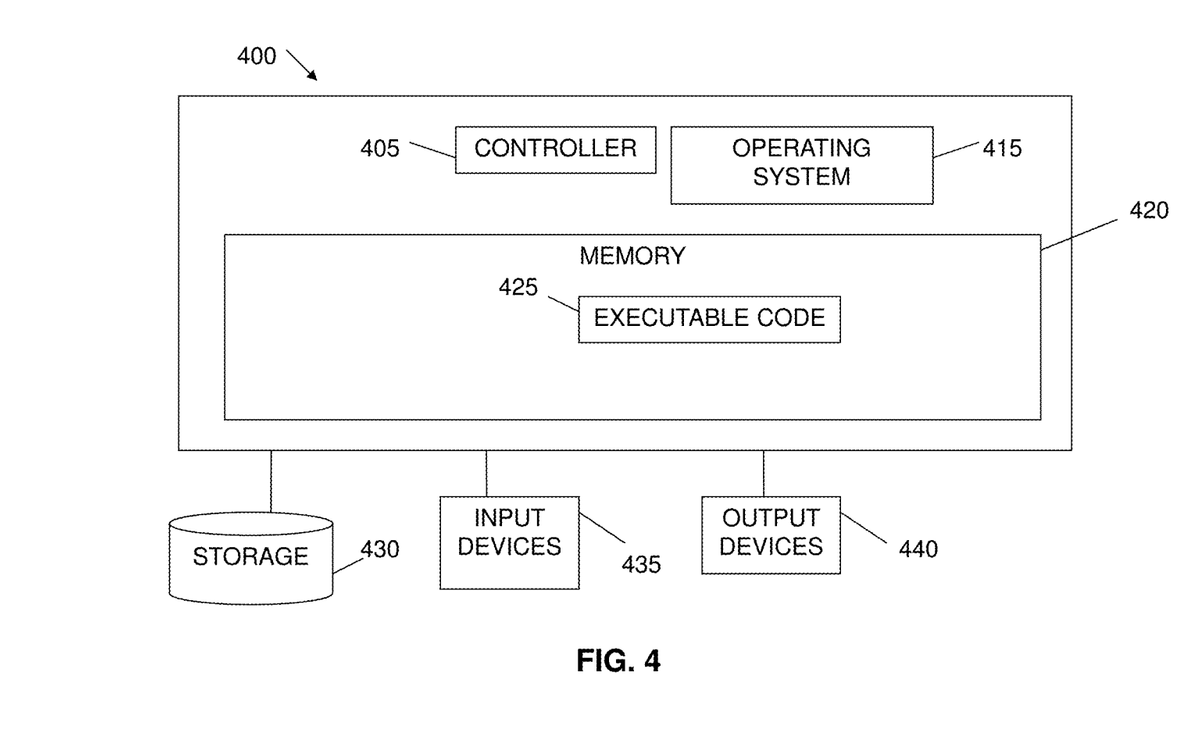
FIG. 4 is a block diagram of a computing device which can be used with embodiments of the invention.

FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 3 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A method for data synchronization in a multi-tenant data synchronization system, the method comprising:
receiving, by a computing device, a plurality of events for each tenant of a plurality of tenants in the multi-tenant system, wherein each event type in the plurality of events has a predetermined event priority;
for each of the plurality of events:
i) determining, by the computing device, a tenant prioritization score based on an agent activity level of a particular tenant of the plurality of tenants that is associated with the particular event of the plurality of events,
ii) assigning, by the computing device, a tenant tier to the respective event based on the tenant prioritization score, and
iii) creating, by the computing device, a data stream for each tenant tier, wherein each data stream includes a plurality of events that was assigned to the respective tenant tier; and
processing, by the computing device, the created data streams in parallel, and the plurality of events in each data stream in an order that is according to the predetermined priority of the event type for the particular event to perform multi-tenant data synchronization,
wherein an agent activity level is based on an average of a number of active agents divided by a number of logged in agents for a given period of time.

2. The method of claim 1 wherein assigning a tenant tier to the respective event further comprises adding the tenant tier to a header of the respective event.

3. The method of claim 1 wherein determining the tenant prioritization score is further based on a weight that distributes the tenants to different tiers.

4. The method of claim 1 further comprising:
determining a maximum processing capacity for each tenant tier; and
utilizing a capacity of a higher tier among the tenant tiers if a lower tier among the tenant tiers is not utilized.

5. The method of claim 1 wherein the number of tenant tiers are an integer value.

6. The method of claim 1 wherein the tenant prioritization score is determined by:
($W1$*account impact score)+Agent Activity level+tenant trend indicator*call queue factor+($W2$*data synchronization event priority).

7. A non-transitory computer program product comprising instruction which, when the program is executed cause the computer to:
receive a plurality of events for each tenant of a plurality of tenants in the multi-tenant system, wherein each event type in the plurality of events has a predetermined event priority;
for each of the plurality of events:
iv) determine a tenant prioritization score based on an agent activity level of a particular tenant of the plurality of tenants that is associated with the particular event of the plurality of events,
v) assign a tenant tier to the respective event based on the tenant prioritization score, and
vi) create a data stream for each tenant tier, wherein each data stream includes a plurality of events that was assigned to the respective tenant tier; and
process the created data streams in parallel, and the plurality of events in each data stream in an order that is according to the predetermined priority of the event type for the particular event to perform multi-tenant data synchronization,
wherein an agent activity level is based on an average of a number of active agents divided by a number of logged in agents for a given period of time.

8. The non-transitory computer program product of claim 7 wherein assigning a tenant tier to the respective event further comprises adding the tenant tier to a header of the respective event.

9. The non-transitory computer program product of claim 7 wherein determining the tenant prioritization score is further based on a weight that distributes the tenants to different tiers.

10. The non-transitory computer program product of claim 7 wherein the non-transitory computer program product further causes the computer to:
   determine a maximum processing capacity for each tenant tier; and
   utilize a capacity of a higher tier among the tenant tiers if a lower tier among the tenant tiers is not utilized.

11. The non-transitory computer program product of claim 7 wherein the number of tenant tiers are an integer value.

12. The non-transitory computer program product of claim 7 wherein the tenant prioritization score is determined by:
   (W1*account impact score)+Agent Activity level+tenant trend indicator*call queue factor+(W2*data synchronization event priority).

* * * * *